(12) United States Patent
Aharoni

(10) Patent No.: US 7,735,009 B2
(45) Date of Patent: Jun. 8, 2010

(54) CONVERSION OF PLAIN TEXT TO XML

(75) Inventor: Ehud Aharoni, Klar Saba (IL)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 11/460,262

(22) Filed: Jul. 27, 2006

(65) Prior Publication Data

US 2008/0028296 A1 Jan. 31, 2008

(51) Int. Cl.
*G06F 17/00* (2006.01)
(52) U.S. Cl. ..................................................... 715/256
(58) Field of Classification Search ................. 715/200, 715/236, 237, 239, 255, 256
See application file for complete search history.

(56) References Cited

U.S. PATENT DOCUMENTS

| | | | | | |
|---|---|---|---|---|---|
| 6,374,274 | B1* | 4/2002 | Myers et al. | ................. | 715/256 |
| 6,684,381 | B1* | 1/2004 | Bening et al. | ................. | 716/18 |
| 6,785,649 | B1* | 8/2004 | Hoory et al. | ................. | 704/235 |
| 6,993,534 | B2* | 1/2006 | Denesuk et al. | ............. | 707/102 |
| 6,996,772 | B2* | 2/2006 | Justice et al. | ............... | 715/236 |
| 2003/0014237 | A1* | 1/2003 | Macklin | ........................ | 704/2 |
| 2003/0023634 | A1* | 1/2003 | Justice et al. | ............... | 707/517 |
| 2004/0010757 | A1* | 1/2004 | McCoy et al. | ............... | 715/530 |
| 2004/0205463 | A1* | 10/2004 | Darbie | ....................... | 715/500 |
| 2005/0177788 | A1* | 8/2005 | Snyder | ....................... | 715/523 |
| 2006/0041637 | A1* | 2/2006 | Jerrard-Dunne | ............. | 709/219 |
| 2006/0104511 | A1* | 5/2006 | Guo et al. | .................... | 382/176 |
| 2006/0149558 | A1* | 7/2006 | Kahn et al. | .................. | 704/278 |
| 2006/0179054 | A1* | 8/2006 | Levi | ............................... | 707/6 |
| 2006/0236227 | A1* | 10/2006 | Achilles et al. | .............. | 715/513 |
| 2006/0259508 | A1* | 11/2006 | Sikdar et al. | ................. | 707/102 |
| 2007/0050757 | A1* | 3/2007 | van Woerkom et al. | ...... | 717/117 |
| 2007/0214134 | A1* | 9/2007 | Haselden et al. | ............... | 707/6 |
| 2007/0265833 | A1* | 11/2007 | Nakayama | .................... | 704/10 |
| 2008/0071783 | A1* | 3/2008 | Langmead et al. | ............. | 707/6 |
| 2008/0133443 | A1* | 6/2008 | Bohannon et al. | ............. | 706/48 |
| 2008/0133745 | A1* | 6/2008 | Donahue | ..................... | 709/224 |
| 2008/0168060 | A1* | 7/2008 | Truty | ............................. | 707/6 |
| 2009/0157708 | A1* | 6/2009 | Bandini et al. | .............. | 707/100 |

OTHER PUBLICATIONS

Hosoya et al., Regualar Expression Types for XML, ACM Jan. 2005, pp. 46-90.*
Yu et al., Fast and Memory-Efficient Regular Expression Matching for Deep Packet Inspection, ACM 2006, pp. 93-102.*
Wood, Standard Generalized Markup Language Mathematical and Philosophical Issues, Google 1995 , pp. 344-365.*
Young-Lai et al., Stochastic Grammatical Inference of Text Databse Structure, Google 2000, pp. 111-137.*
Iyengar et al., A Method for Automating Text Markup, Google 2000, pp. 1-6.*

* cited by examiner

*Primary Examiner*—Cong-Lac Huynh

(57) ABSTRACT

Methods and systems are provided for converting text to XML code. A schema is applied to the text. The schema is a XML-compliant template that incorporates a single enhanced regular expression. One enhancement causes the matched text to be concatenated and displayed. The concatenated matched text is merged with the template to generate a markup language-compliant output. The enhanced regular expression can include a grouping operator that is nestable within another regular expression operator, for example the "*" operator that matches zero or more instances of its operand. Special purpose tags may be defined in the schema to represent regular expression operators.

17 Claims, 1 Drawing Sheet

CONVERSION OF PLAIN TEXT TO XML

BACKGROUND OF THE INVENTION

1. Field of the Invention

This invention relates to computer data processing. More particularly, this invention relates to the transformation of plain text into a markup language document.

2. Description of the Related Art

TABLE 1

| Acronyms and Abbreviations | |
|---|---|
| DTD | Document Type Definition |
| ISO | International Organization for Standardization |
| SGML | Standard Generalized Markup Language |
| XML | Extensible Markup Language |

Markup language documents, such as XML documents, have become a common mode of data exchange on the Internet and elsewhere. XML is a subset of SGML (ISO 8879). There remain many data sources and older computer programs, however, in which the data or the output is in the form of text that does not comply with XML requirements.

In U.S. Patent Application Publication No. 2005/0091588 it is proposed to transform text into XML format using a text transformer program. A wizard guides the user through a process of developing a script, which is then executed using the document or output to be transformed. Template rules are used to establish a hierarchical structure of the output XML stream.

SUMMARY OF THE INVENTION

An embodiment of the invention provides a method of converting text to markup language-compliant code, which is carried out by applying a schema to the text, wherein the schema includes a regular expression having printer tokens embedded therein and has sections that are delimited by a grouping operator. The method is further carried out by matching the text with the regular expression to identify portions of the text that match each of the sections, and for each of the sections concatenating the printer tokens and respective identified portions of the text to generate an output that is compliant with the markup language. The printer tokens each cause a constant string to be generated in the output. The grouping operator may be nested within another regular expression operator.

Other embodiments of the invention provide a computer software product and apparatus for converting text to code that is compliant with a markup language and which apply the above-described method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well-known and will not be further discussed herein.

System Overview.

Disclosed embodiments of the invention address the problem of translating flat text files to markup language code, e.g., XML code. The transformation is useful to enable information carried in the text to be conveniently viewed using a browser, for example in a networked environment such as the Internet. Conventional approaches to this problem have involved complicated data structures or the use of special languages. Aspects of the invention use a schema file, which consists of a single regular expression with a few enhancements. When matched with the text, the result is an output stream that complies with the syntax of the markup language.

Figure 1:
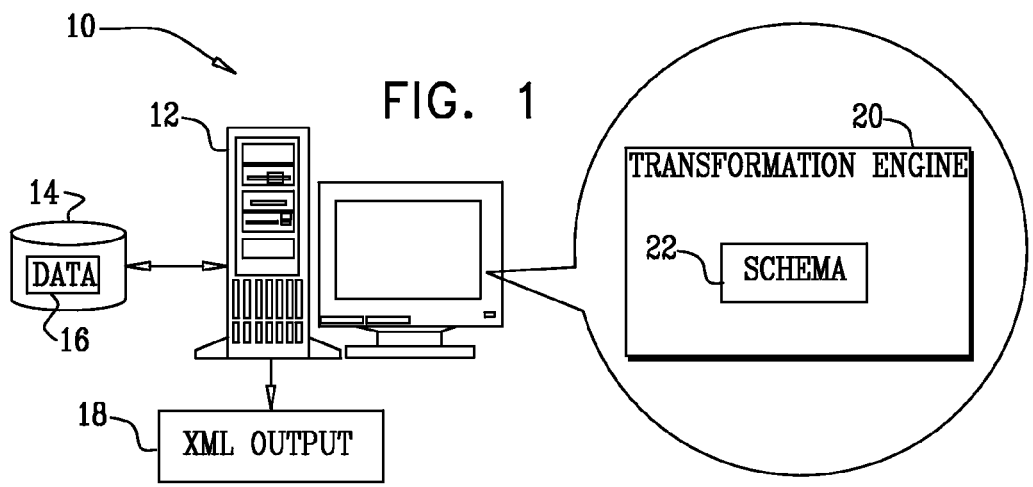
FIG. 1 is a diagram illustrating a system for conversion of plain text to XML code in accordance with a disclosed embodiment of the invention.

Turning now to the drawings, reference is initially made to FIG. 1, which is a diagram illustrating a system 10 that is suitable for carrying out the invention. The invention is not limited to the particular computer arrangement shown, but is applicable to many combinations of computers and servers, including distributed file systems and databases.

A processor 12 has access to generic memory storage 14, which holds data 16 to be transformed. The data 16 may be a consolidated or a distributed database from which information is retrieved in textual format, for example by legacy database software. Alternatively, the data could be in the form of text files, or files that are convertible to text using existing software. The processor 12 emits an output 18. In the current embodiment the output is XML code. However, it will be apparent that by suitable modification within ordinary skill in the art, the output may comply with the requirements of many different languages, including other markup languages.

The processor 12 typically comprises one or more general purpose or embedded computer processors, which are programmed with suitable software for carrying out the functions described hereinbelow. Thus, although the processor 12 is shown in FIG. 1 as comprising a number of separate functional blocks, these blocks are not necessarily separate physical entities, but rather represent different computing tasks.

These tasks may be carried out in software running on a single processor, or on multiple processors. As noted above, the software may be provided to the processor or processors in electronic form, for example, over a network, or it may be furnished on tangible media, such as CD-ROM or non-volatile memory. Alternatively or additionally, at least a portion of the processor 12 may comprise a digital signal processor or hard-wired logic.

Executing in the processor 12 is a transformation engine 20, which actually carries out the transformation of the data 16 into the output 18. A schema file 22, which can be stored in the memory storage 14, is applied to the data 16 by the transformation engine 20. The schema file 22 is syntactically XML code containing a single enhanced regular expression, and is described in further detail below. It is not to be confused with a XML schema or a DTD. Should the regular expression match a portion of the data 16, tokens of the schema file are merged with the matched portions of the data 16 and the result passed to the output 18.

Transformation Engine.

Continuing to refer to FIG. 1, as noted above, in some embodiments the schema file 22 employs a single regular expression with certain enhancements. Because in such embodiments the schema file 22 is limited to one regular expression, its syntax is simply described, and it is consequently convenient to implement. By specifying an appropriate schema file, the transformation engine 20 is able to process a wide range of file formats.

As will be appreciated from the detailed description below, the schema file 22 is intuitively organized. Thus the structure of the output 18 can be easily derived from the schema file 22. Also, the document type definition (DTD) corresponding to the output 18 can be automatically deduced from the schema file 22.

The regular expression in the schema file 22 is similar to regular expressions in the well-known languages Perl and Python®. Briefly, as shown in Listing 1, which is a fragment of Perl code, a regular expression book: (.*) author: (.*), performs two functions: First, it returns a Boolean indication of a match. Second, if there is a match, an array ($1, $2, . . . ) is filled with strings retrieved from the text in the areas marked with "( )" in the regular expression. In the discussion herein, unless otherwise stated, regular expression operators have conventional meanings. Thus, the operator "*", sometimes referred to herein as a "wild" operator, matches zero or more instances of its operands. The ( ) operator is called the grouping operator. Python allows the same functionality.

| Listing 1 |
|---|
| my $text="book: Moby Dick author: Herman Melville" <br> ($text =~ /book: (.*) author: (.*)/) or die; <br> my $book=$1; <br> my $author=$2; |

Enhancement 1.

However, instead of simply returning the extracted substrings in an array, as a first enhancement of conventional regular expressions, the transformation engine 20 both concatenates and prints the extracted substrings to the standard output, e.g., stdout. In the above example, the concatenated output would be "Moby DickHerman Melville".

Enhancement 2.

As a second enhancement, in regular expressions according to aspects of the invention, the grouping operator ( ) can be nested within other operators. For example, one can write a regular expression:

| Regular Expression 1 |
|---|
| {book: (.*) author: (.*)\n}*, | in which a grouping operator ( ), is nested inside the wild operator "*". Here, the brackets { } simply force operator precedence in a non-ambiguous way, and do not retrieve text by themselves. The grouping operator ( ) forces operator precedence and also marks text to be retrieved, identically to Perl or Python. The { } operator is an aspect of the second enhancement for the purpose of nesting. If Regular Expression 1 is matched against:

book: Moby Dick author: Herman Melville
    book: Lord of the Rings author: Tolkien the output is
    Moby DickHerman MelvilleLord of the RingsTolkien.

Implementation of this enhancement is described below in further detail. While Perl and Python also allow activation of the wild operator * on the grouping operator ( ), only the last instances matched are retrieved. In the above example, only "Lord of the Rings" and "Tolkien" would be returned.

Enhancement 3.

A special token, the "printer" token (shown underlined), matches empty strings, that is strings having a length of zero, and prints a string constant to the output. Consider the following regular expression:

| Regular Expression 2 |
|---|
| digits: FOUND DIGITS (\d\d\d). |

If compared with the text
    digits: 123 there will be a match, and the output will be
    "FOUND DIGITS 123".

Consider the following modification of Expression 1:

| Regular Expression 3 |
|---|
| {<book><title > <br> book: (.*)</title> <br> <author>author: (.*)</author></book>\n }* |

Underlined text in Regular Expressions 2 and 3 indicate printer tokens. It will be recalled that printer tokens match empty strings and generate a constant string in the output. When matched against the same text, the output of Regular Expression 3 appears as XML code, as shown in Listing 2. The underlined text in Listing 2 corresponds to the printer tokens of Regular Expression 3. Underlined notation is employed here for convenience of presentation of printer tokens and is not necessarily utilized elsewhere in this disclosure.

Listing 2

```
<book>
    <title>Moby Dick</title>
    <author>Herman Melville</author>
</book>
<book>
    <title>Lord of the Rings</title>
    <author>Tolkien</author>
</book>
```

In the initial output of Regular Expression 3 by the transformation engine 20, the entire XML result is printed in the same line. However, using known XML utilities, e.g., the Xerces XML library, available from the Apache XML project at "xml.apache.org", the output can be more attractively formatted if desired, as shown in Listing 2.

Enhancement 4.

The schema file of the transformation engine 20 is syntactically XML code with the following rules:

(1) All of the XML tags are printer tokens, except some special purpose tags described below.

(2) Regular expression operators, e.g., *, + and |, when applied over XML tags are encoded by special purpose XML tags: <_star>, <_plus>, <_or>, respectively. This increases readability and helps in debugging when parsing the schema.

Using the example of Regular Expression 3, the template in the schema file 22 would appear as shown in Listing 3.

Listing 3

```
<_star>
    <book>
        <title>book: (.*)</title>
        <author> author: (.*)</author>
    </book>  \n
</_star>
```

The tag "<_star>...</_star>" is equivalent to applying the * operator on the enclosed content.

By default, the transformation engine 20 applies the regular expression described by the schema file 22 to match the entire input text. Alternatively, special anchors, e.g., ^ and $, may specify the beginning and ending, respectively, of a segment of input text to be matched.

Implementation.

Continuing to refer to FIG. 1, the transformation engine 20 operates as follows: The single regular expression described by the schema file 22 is converted to a non-deterministic automaton. Such automatons, also known as finite state automatons, are well known in the art, and are therefore not further explained herein. The automaton is linear in the size of the schema file. Since the regular expression is enhanced, the automaton is also enhanced by printing instructions in its nodes. These instructions are executed when an accepting path is found. Most nodes have no printing instructions.

Figure 2:
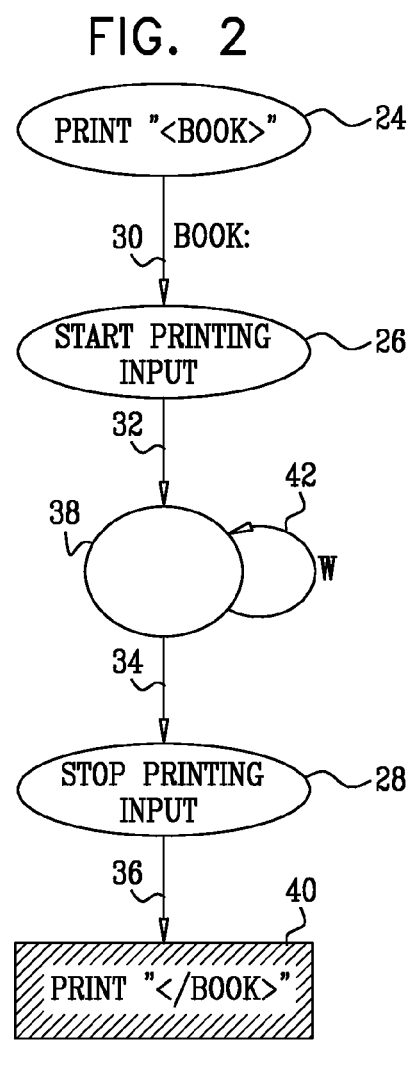
FIG. 2 is an automaton graph derived from a schema file in accordance with a disclosed embodiment of the invention.

Reference is now made to FIG. 2, which is an exemplary automaton graph derived from a schema file containing a regular expression (Regular Expression 4, shown below), in accordance with a disclosed embodiment of the invention. Printer tokens are converted to automatons with a single node. The node contains an instruction to print the token. For example, a node 24 includes an instruction to print the token <Book>. The grouping operator ( ) adds nodes that turn input printing on and off, represented by nodes 26, 28, respectively. The automaton graph has edges 30, 32, 34, 36, 42 and nodes 38, 40 (in addition to the nodes 26, 28). The node 38 is repeatedly entered via a loop (edge 42). The edges 32, 34, 36 are epsilon (empty) edges. The node 40 (shown in hatching in FIG. 2) is an accepting node.

The transformation engine 20 searches for an accepting path in polynomial time. Polynomial time is achieved as follows: (1) A list of pointers to nodes in the automaton graph is kept, starting with a single pointer in the first node of the automaton. (2) For each new input character the list of pointers is updated according to the automaton non-deterministic rules. If two or more pointers reach the same node, one of them is discarded. (3) When all input is read, it is determined whether there is a pointer to an accepting node.

If an automaton graph has N nodes, and the input has M characters, then at most O(NM) transitions are performed on the graph. When searching for an accepting path, additional data is maintained in order to allow reconstruction of the path when found. Then its printing instructions can be carried out. There is a tradeoff: although the transformation engine 20 is quite fast, in the event that there are multiple accepting paths, there is no control over which path will be chosen. In contrast, Perl and python employ slower engines, which allow a specification for each * or + operator, that is whether or not it is to be greedy.

Figure 3:
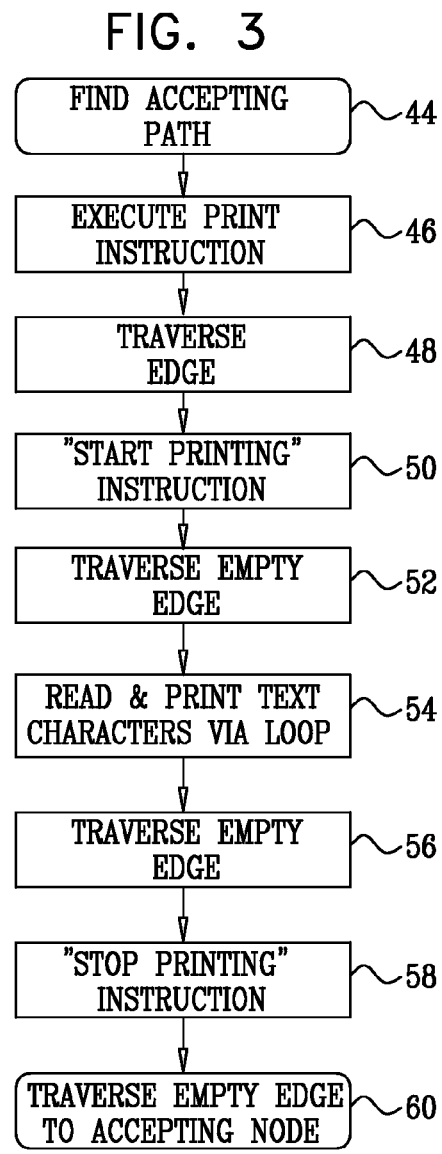
FIG. 3 is a flow chart illustrating the application of an automaton graph to matched text in accordance with a disclosed embodiment of the invention.

Reference is now made to FIG. 3, which is a flow chart illustrating the application of an automaton graph to matched text in accordance with a disclosed embodiment of the invention. FIG. 3 is described with reference to the example of FIG. 2, which is the result of an enhanced regular expression Regular Expression 4

"<book>book: (\w+)</book>".

At initial step 44, an accepting path is found. Regular Expression 4 is matched with the text "book: Dune". The existence of a match means that an accepting path in the automaton graph has been found. Once found, it is traversed again, and the instructions within it are executed.

Traversal of the accepting path that was found in initial step 44 begins at step 46. Here the printing instruction in the topmost node, node 24 (FIG. 2), is executed. An output, "<book>" eventually appears.

Next, at step 48, the edge 30 (FIG. 2) is traversed by reading the text "book:" from the input.

Next, at step 50, the "start printing input" instruction found in the node 26 (FIG. 2) is initiated. While this instruction is in force, every input character read is immediately printed to the output.

Next, at step 52, the epsilon edge 32 is traversed downward to the node 38, without reading any input text.

Next, at step 54, the node 38 is entered four times via the loop 42, during which four input characters "Dune" are read and printed. (The notation "\w" in FIG. 2 matches any alphabetical letter). At the completion of step 54, the cumulative output is "<book>Dune".

Next, at step 56 the empty edge 34 is traversed downward to the node 28 (FIG. 2) without reading any input text. Then, at step 58 input printing is disabled.

Next, at final step 60, the epsilon edge 36 is traversed downward to reach the node 40 (FIG. 2), which was marked as an accepting node. Finally, the printing instruction in this node is executed, producing the cumulative output: "<book>Dune</book>". The procedure ends.

Example 1

Each line of a flat text file shown in Listing 4 contains a book name and an author separated by a comma.

---
Listing 4
---
Moby Dick, Herman Melville
Lord of the Rings, Tolkien
Dune, Frank Herbert
---

The goal is to convert the text of Listing 4 to the XML code shown in Listing 5.

---
Listing 5
---
```
<catalog>
    <book>
        <title>Moby Dick</title>
        <author>Herman Melville</author>
    </book>
    <book>
        <title>Lord of the Rings</title>
        <author>Tolkien</author>
    </book>
    <book>
        <title>Dune</title>
        <author>Frank Herbert</author>
    </book>
</catalog>
```
---

The schema file for doing the conversion is shown in Listing 6. The <_star> tag is converted to a * operator of the regular expression, indicating that the element <book> should be repeated zero or more times, along with its contents. Note the comma after the <title> element, and the "\n" after the <book> element, which mark the end of the content that corresponds to each element, respectively.

---
Listing 6
---
```
<catalog>
    <_star>
        <book>
            <title>(.*)</title>,
            <author>(.*)</author>
        </book>
        \n
    </_star>
</catalog>
```
---

It is evident that the layout of the output created using the schema file of Listing 3 is clear, simple, and efficient. Most of the characters it contains are characters expected from the input, or characters intended to be printed to the output. The few operators that do appear are familiar regular expression operators.

Example 2

Consider the flat text file of Listing 7, which is a list of flight arrivals. Listing 7 is organized as a time entry followed by a list of flight numbers corresponding to flights arriving at the time specified by the time entry.

---
Listing 7
---
12:04 ABC045 TWA123 12:07 GCX001 AAA002 BAB054 14:32 DDA004
---

It is desired to convert the text of Listing 7 to the XML code shown in Listing 8.

---
Listing 8
---
```
<arrivals>
    <arrival>
        <time>12:04</time>
        <flights>ABC045 TWA123</flights>
    </arrival>
    <arrival>
        <time>12:07</time>
        <flights>GCX001 AAA002 BAB054</flights>
    </arrival>
    <arrival>
        <time>14:32</time>
        <flights>DDA004</flights>
    </arrival>
</arrivals>
```
---

The schema file to accomplish the conversion is given in Listing 9. Note that "\d" matches a digit, "\w" matches an alphanumeric character and "\s" matches a white space character.

---
Listing 9
---
```
<arrivals>
    <_star>
        <arrival>
            <time>(\d\d:\d\d)\s</time>
            <flights>(\w\w\w\d\d\d\s)*</flights>
        </arrival>
    </_star>
</arrivals>
```
---

According to the operation of the regular expression, the content of the <flights> element is filled until either (1) a place is reached where the next <time> element can be matched or the end of the file is encountered. Alternatively, the similar schema file of Listing 10 could be used to generate the slightly different output of Listing 11. Here each flight has its own <flight> tag. While longer, this alternative has the advantage of greater readability. It should be noted that with the exception of the special tags <_star>, </_star>, all the XML tags in Listing 10 are printer tokens.

---
Listing 10
---
```
<_star>
    <arrival>
        <time>(\d\d:\d\d)\s</time>
        <flights>
            <_star>
                <flight>(\w\w\w\d\d\d)\s</flight>
            </_star>
        </flights>
    </arrival>
</_star>
```
---

Listing 11

```
<arrivals>
    <arrival>
        <time>12:04</time>
        <flights>
            <flight>ABC045</flight>
            <flight>TWA123</flight>
        </flights>
    </arrival>
    <arrival>
        <time>12:07</time>
        <flights>
            <flight>GCX001</flight>
            <flight>AAA002</flight>
            <flight>BAB054</flight>
        </flights>
    </arrival>
    <arrival>
        <time>14:32</time>
        <flights>
            <flight>DDA004</flight>
        </flights>
    </arrival>
</arrivals>
```

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of converting text to code that is compliant with a markup language, comprising the steps of:
    applying a schema to said text, wherein said schema comprises a regular expression having printer tokens embedded therein and having sections, each of said sections being delimited by a grouping operator, wherein said schema comprises special purpose tags that are compliant with said markup language, said special purpose tags respectively encoding regular expression operators, wherein applying said schema comprises applying said encoded regular expression operators to said text for matching thereof;
    matching said text with said regular expression to identify portions of said text that match each of said sections; and
    for each of said sections concatenating said printer tokens and respective identified portions of said text to generate an output that is compliant with said markup language, printer tokens each for generating a constant string.

2. The method according to claim 1, wherein said printer tokens comprise markup language tags.

3. The method according to claim 1, wherein said grouping operator is nestable within another regular expression operator.

4. The method according to claim 3, wherein said another regular expression operator matches zero or more instances of an operand thereof.

5. The method according to claim 1, wherein said printer tokens exclude said special purpose tags.

6. The method according to claim 1, wherein said schema consists of no more than one regular expression.

7. A computer software product for converting text to code that is compliant with a markup language, including a tangible computer-readable medium in which computer program instructions are stored, which instructions, when read by a computer, cause the computer to:
    apply a schema to said text, wherein said schema comprises a regular expression having printer tokens embedded therein and having sections, each of said sections being delimited by a grouping operator, wherein said schema comprises special purpose tags that are compliant with said markup language, said special purpose tags respectively encoding regular expression operators, wherein applying said schema comprises applying said encoded regular expression operators to said text for matching thereof;
    match said text with said regular expression to identify portions of said text that match each of said sections; and
    for each of said sections concatenate said printer tokens and respective identified portions of said text to generate an output that is compliant with said markup language, printer tokens each for generating a constant string.

8. The computer software product according to claim 7, wherein said printer tokens comprise markup language tags.

9. The computer software product according to claim 7, wherein said grouping operator is nestable within another regular expression operator.

10. The computer software product according to claim 9, wherein said another regular expression operator matches zero or more instances of an operand thereof.

11. The computer software product according to claim 7, wherein said printer tokens exclude said special purpose tags.

12. The computer software product according to claim 7, wherein said schema consists of no more than one regular expression.

13. A data processing system for converting text to code that is compliant with a markup language, comprising:
    a memory accessible having a schema stored therein, wherein said schema comprises a regular expression having printer tokens embedded therein and having sections, each of said sections being delimited by a grouping operator, wherein said schema comprises special purpose tags that are compliant with said markup language, said special purpose tags respectively encoding regular expression operators, wherein applying said schema comprises applying said encoded regular expression operators to said text for matching thereof;
    a processor operative to:
    receive said text as input;
    apply said schema to said text to identify portions of said text that match each of said sections; and
    for each of said sections concatenate said printer tokens and respective identified portions of said text to generate an output that is compliant with said markup language, printer tokens each for generating a constant string.

14. The data processing system according to claim 13, wherein said grouping operator is nestable within another regular expression operator.

15. The data processing system according to claim 14, wherein said another regular expression operator matches zero or more instances of an operand thereof.

16. The data processing system according to claim 13, wherein said printer tokens comprise markup language tags and said printer tokens exclude said special purpose tags.

17. The data processing system according to claim 13, wherein said schema consists of no more than one regular expression.

* * * * *